(12) United States Patent
Hamblin et al.

(10) Patent No.: US 8,662,181 B2
(45) Date of Patent: Mar. 4, 2014

(54) STABPLATE CONNECTIONS

(75) Inventors: Andrew S. Hamblin, Bristol (GB); Gareth H. Lewis, Bristol (GB)

(73) Assignee: Vetco Gray Controls Limited, Nailsea, Bristol (GB)

(*) Notice: Subject to any disclaimer, the term of this patent is extended or adjusted under 35 U.S.C. 154(b) by 373 days.

(21) Appl. No.: 12/877,214

(22) Filed: Sep. 8, 2010

(65) Prior Publication Data
US 2011/0088909 A1 Apr. 21, 2011

(30) Foreign Application Priority Data
Sep. 9, 2009 (GB) .................................. 0915769.4

(51) Int. Cl.
*E21B 7/12* (2006.01)
(52) U.S. Cl.
USPC ............ 166/338; 166/344; 166/363; 166/364
(58) Field of Classification Search
USPC ......... 166/338, 344, 368, 363, 364, 373, 339, 166/341, 381
See application file for complete search history.

(56) References Cited

U.S. PATENT DOCUMENTS

| | | | | |
|---|---|---|---|---|
| 3,189,098 A | * | 6/1965 | Haeber ........................ | 166/352 |
| 3,504,740 A | * | 4/1970 | Manning ...................... | 166/339 |
| 4,133,378 A | * | 1/1979 | Gano .......................... | 166/242.3 |
| 4,262,748 A | * | 4/1981 | Kirkland ...................... | 166/348 |
| 4,401,164 A | * | 8/1983 | Baugh ......................... | 166/379 |
| 4,668,126 A | * | 5/1987 | Burton ......................... | 405/169 |
| 5,738,142 A | * | 4/1998 | Eike et al. ................... | 137/596.17 |
| 5,794,701 A | * | 8/1998 | Cunningham et al. ........ | 166/341 |
| 6,142,233 A | * | 11/2000 | Wilkins ....................... | 166/339 |
| 6,226,068 B1 | * | 5/2001 | Arcykiewicz et al. ........ | 439/314 |
| 6,644,410 B1 | | 11/2003 | Lindsey-Curran et al. | |
| 7,104,330 B2 | * | 9/2006 | Legras et al. ................ | 166/367 |
| 7,243,729 B2 | * | 7/2007 | Tyrrell et al. ................ | 166/338 |
| 7,828,064 B2 | * | 11/2010 | Robichaux et al. .......... | 166/358 |
| 2008/0143100 A1 | * | 6/2008 | Webster ....................... | 285/18 |
| 2008/0202760 A1 | | 8/2008 | Cosgrove et al. | |

FOREIGN PATENT DOCUMENTS

| | | |
|---|---|---|
| GB | 2361274 A | 10/2001 |
| GB | 2425565 A1 | 1/2006 |
| WO | 9931426 A1 | 6/1999 |
| WO | 03023184 A1 | 3/2003 |
| WO | 2008039887 A2 | 4/2008 |

OTHER PUBLICATIONS

Intellectual Property Office Search Report issued in GB0915769.4; Nov. 20, 2009.

* cited by examiner

*Primary Examiner* — Matthew Buck
*Assistant Examiner* — Aaron Lembo
(74) *Attorney, Agent, or Firm* — Bracewell & Giuliani LLP

(57) ABSTRACT

A stabplate connection is provided by: providing a first part (1) comprising a stabplate and carried by an underwater structure; providing a second part (2) comprising a stabplate carried by tooling (4); engaging the tooling with said first part; using the tooling to bring the parts together so the stabplates mate with each other; using the tooling to lock the first and second parts together by engaging a portion (6) carried by the first part with a portion (10) carried by the second part; disengaging the tooling from the first part; and removing the tooling from the stabplate connection.

32 Claims, 8 Drawing Sheets

STABPLATE CONNECTIONS

RELATED APPLICATION

This application claims priority to United Kingdom Patent Application No. 0915769.4 filed Sep. 9, 2009.

FIELD OF THE INVENTION

The present invention relates to stabplate connections.

BACKGROUND OF THE INVENTION

Electric and hydraulic power, chemical injection and communications are typically transmitted to subsea wells via an umbilical from a surface or land based platform, the umbilical being terminated at an umbilical termination assembly (UTA). The feeds for hydraulic power and chemical injection are effected from the UTA to a well tree, which houses a well control system, by a multiplicity of self-sealing individual connectors. In order to facilitate mating or unmating of the hydraulic power and chemical injection connectors subsea by a remotely operated vehicle (ROV), they are typically mounted together on a plate known as a stabplate, so that a single ROV action mates all the connectors. Such a stabplate arrangement is normally reserved for the hydraulic power and chemical injection feeds to the well. The ROV locates the stabplate to a fixed reciprocal plate mounted on the subsea tree, and, typically, a screw mechanism is operated by the ROV to force the two plates to mate and to lock them together. The mating and locking screw mechanism is, typically, part of the stabplate connection and remains subsea during the operation of the well. Unmating of the stabplate connection for maintenance/repair purposes involves an operation by an ROV of unscrewing the screw mechanism, which is designed to force the mated plates apart.

There are two problems with the arrangement described above. Leaving the screw mechanism subsea for lengthy periods of time can result in corrosion and contamination (e.g. biological growths) which can cause the screw mechanism to seize. The result is either the need for other forceful methods of separating the stabplate from the fixed plate (invariably resulting in expensive damage to the well tree and parts of the stabplate connection) or the additional cost of including a secondary release mechanism in the design of the stabplate connection. Furthermore, existing locking mechanisms, while functional, also leave large amounts of expensive equipment built into every stabplate connection, adding weight, complexity and cost.

SUMMARY OF THE INVENTION

According to the present invention from one aspect, there is provided a method of providing a stabplate connection, comprising the steps of:

(a) providing a first part comprising a stabplate and which is attached to an underwater structure;
(b) providing a second part comprising a stabplate carried by tooling;
(c) engaging the tooling with said first part;
(d) using the tooling to bring the first and second parts together so that said stabplates mate with each other;
(e) using the tooling to lock the first and second parts together by engaging a portion carried by the first part with a portion carried by the second part;
(f) disengaging the tooling from the first part; and
(g) removing the tooling from the stabplate connection.

Said tooling could have an end part which engages or disengages with said first part as a result of passing through said first and second parts.

Said portion of the second part could comprise a locking dog moved using said tooling. In this case said tooling could move a collar carried by said second part to move said locking dog, said collar comprising a bayonet fitting for being locked to or unlocked from said second part as a result of rotation of the collar.

Alternatively, said portions could comprise a rotatable latching member of one of the first and second parts which engages with a latching member of the other of said first and second parts.

Steps (c) to (g) are preferably carried out using an ROV carrying said tooling.

The present invention also comprises a stabplate connection provided by a method according to the invention.

The present invention further comprises a method of disconnecting a stabplate connection provided by a method according to the invention, comprising the steps of:

(h) engaging such tooling with the first and second parts;
(i) using the tooling to unlock the first and second parts from each other by disengaging said portions of the first and second parts;
(j) using the tooling to unmate the stabplates from each other; and
(k) using the tooling to remove the second part.

Steps (h) to (k) are preferably carried out using an ROV carrying said tooling.

According to the present invention from a further aspect, there is provided an arrangement for providing a stabplate connection, comprising:

a first part for being attached to an underwater structure and comprising a stabplate; and
a second part comprising a stabplate carried by tooling, the arrangement being such that:
the tooling is engageable with said first and second parts;
the tooling can be used to bring the first and second parts together so that the stabplates mate with each other;
the tooling can be used to lock the first and second parts together by engaging a portion carried by the first part with a portion carried by the second part; and
the tooling is disengageable from the first part and removable from the stabplate connection.

DETAILED DESCRIPTION OF EXAMPLES OF THE INVENTION

Figure 1:
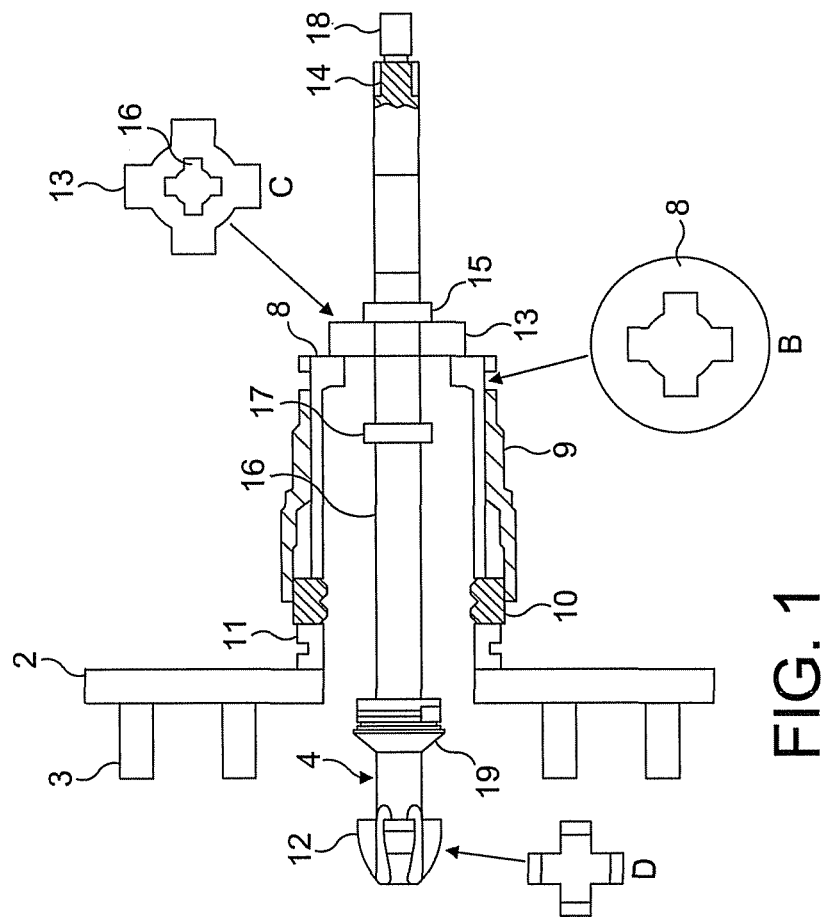
FIG. 1 illustrates the components of a first example of an arrangement according to the invention for providing a stabplate connection.
Figure 1:
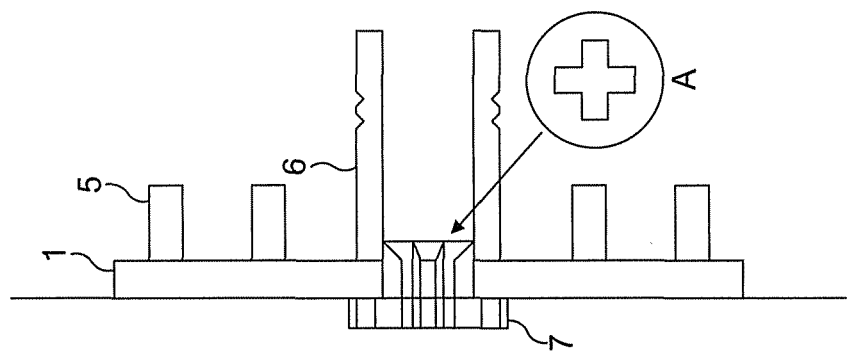

FIG. 1 illustrates the component parts of an arrangement in which a fixed part comprising a stabplate and a removable part comprising a stabplate are drawn together using threaded tooling and then locked in place by sliding dogs held in place by a bayonet locking collar. More particularly, the stabplate arrangement comprises a fixed part comprising a stabplate 1, attached to a subsea structure (such as a well tree) and a second, removable part comprising a stabplate 2, carrying connectors 3 typically fed from a UTA, and recoverable tooling comprising a threaded tooling packing 4 carrying the stabplate 1. The stabplate 1 carries connectors 5 to be mated with connectors 3, for clarity connectors 5 and 3 being omitted from the remaining figures. Although only four connectors 3 and four connectors 5 are shown for simplicity, in practice there could be more. The stabplate 1 carries a tube 6 with two circumferential grooves and an anchor block 7, with a central orifice having a cruciform cross-section as shown in the view A, both attached to the stabplate 1. The stabplate 2 carries a dog support cage 8, attached to the stabplate 2 and with an orifice having a cross-section as shown in view B, a bayonet locking collar 9, a pair of locking dogs 10 and a bayonet locking pin locator 11. The retrievable tooling package 4 has a chamfered end 12, with a cruciform cross-section as illustrated by view D, a latching/de-latching plate 13, whose section is a male version of the orifice in the dog support cage 8 (see view C), a shaft 14 which is attached to a collar 15 of the retrievable tooling package 4, and is threaded and screwed into an internally threaded tube 16 of the tooling package, a collar 17 attached around the tube 16, a square-ended shaft 18 which runs concentrically through the tube 16 and a tapered portion 19 at the end of tube 16 before end 12 of the tooling package 4. The plate 13 is splined on to shaft 16—see View C.

FIGS. 2 to 9 illustrate steps in the operation of the stabplate arrangement is effected by an ROV which carries tooling package 4.

Figure 2:
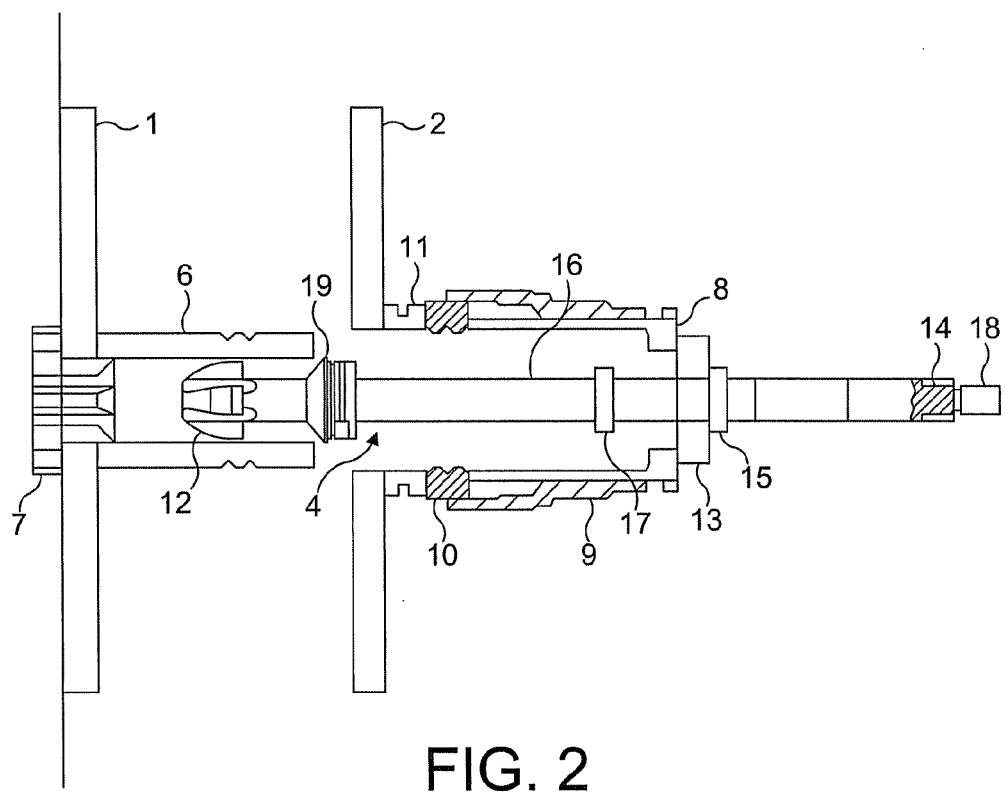
FIGS. 2-4 illustrate steps in providing the stabplate connection.

FIG. 2 shows the first stage of mating of the stabplate 2 to the fixed stabplate 1, with the chamfered end 12 of the retrievable tooling package 4 located in the tube 6.

Figure 3:
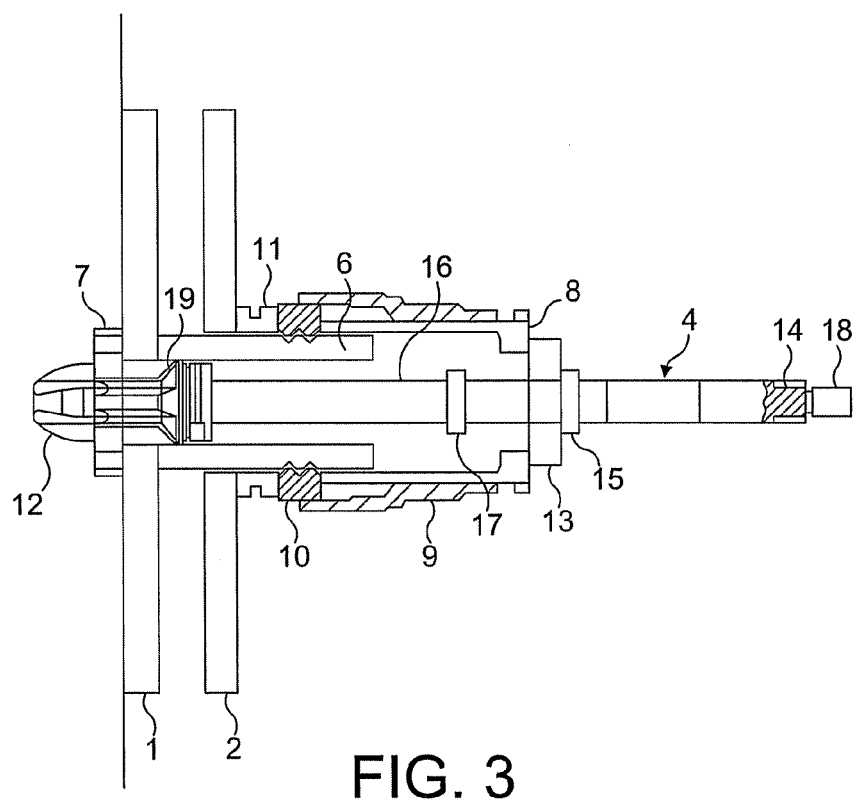

FIG. 3 shows the stabplate 2 further pushed towards the fixed stabplate 1, so that the chamfered end 12 of the retrievable tooling 4 passes through the orifice of the anchor block 7. The chamfered end 12 is rotated through about 45 degrees to lock the retrievable tooling package 4 to the fixed stabplate 1 with the chamfered end 12 engaged with the stabplate 1 via anchor block 7 and tapered end portion 19 received in the tapered entrance to the orifice. This is achieved by rotating square-ended shaft 18, which runs concentrically through the retrievable tooling package 4 and is attached to the chamfered end 12. Having mated and locked the end 12 to the anchor block 7, the threaded shaft 14 is rotated to screw into the tube 16 so that the collar 15 presses against the latching/de-latching plate 13, and thus the dog support cage 8, forcing the stabplates 1 and 2, together and providing the substantial force required to mate the connectors 3 and 5 mounted on the stabplates.

Figure 4:
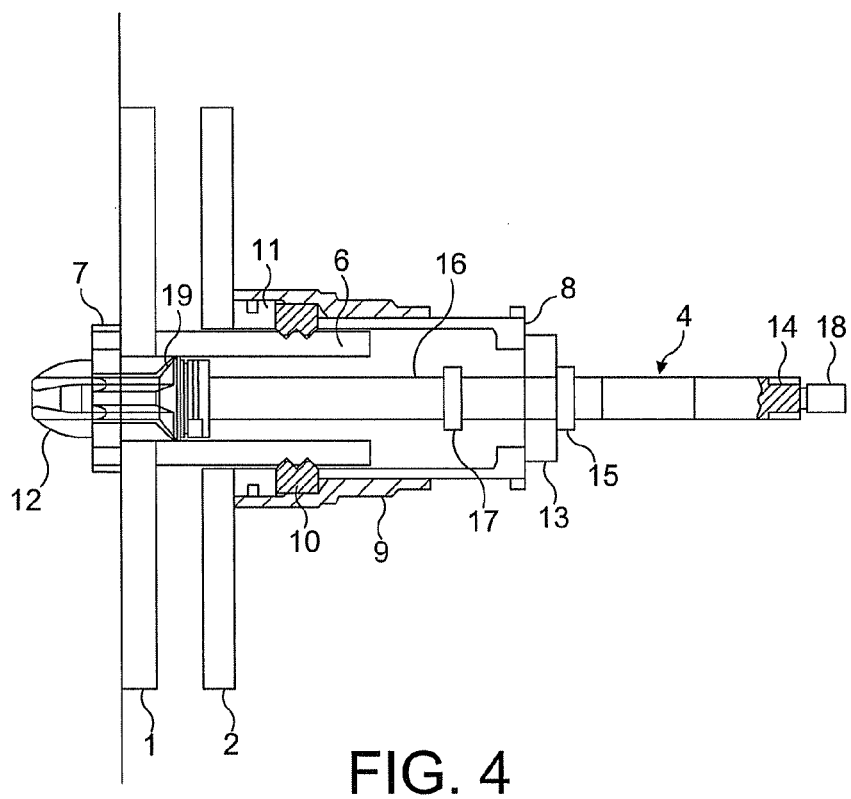
Figure 5:
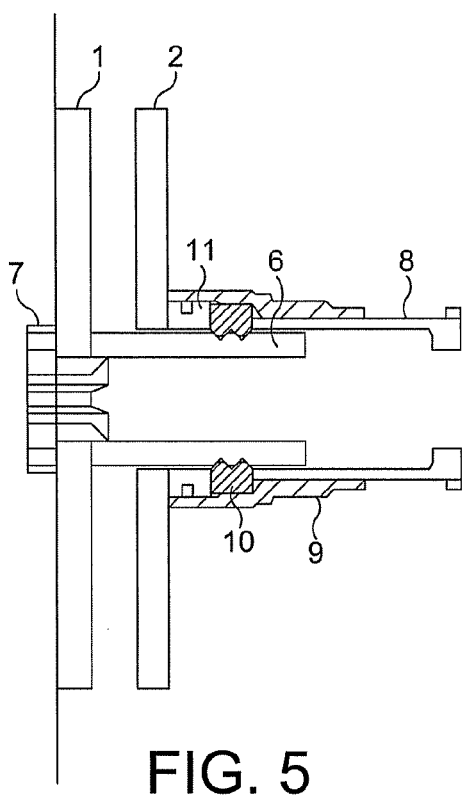
FIG. 5 illustrates the resultant stabplate connection.

FIG. 4 shows, after completion of the mating of the stabplates via connectors 3 and 5, the next action of pushing forward the bayonet locking collar 9, so that the locking dogs 10 are forced to engage with the grooves in the collar 6. The bayonet locking collar 9 is then rotated to engage its bayonet pins into the bayonet locking pin locator 11, thus locking the mated stabplates 1 and 2 together. The threaded shaft 14 is rotated to unscrew from the tube 16 so that the force on the collar 15 and the latching/de-latching plate 13 on the dog support cage 8 is released, thus allowing the square-ended shaft 18 to be rotated by about minus 45 degrees, thus permitting release of the chamfered end 12 of the retrievable tooling package 4 and permitting its withdrawal from the mated stabplates 1 and 2, the result being as shown in FIG. 5. If necessary the tooling package 4 is returned to the surface using the ROV.

Figure 6:
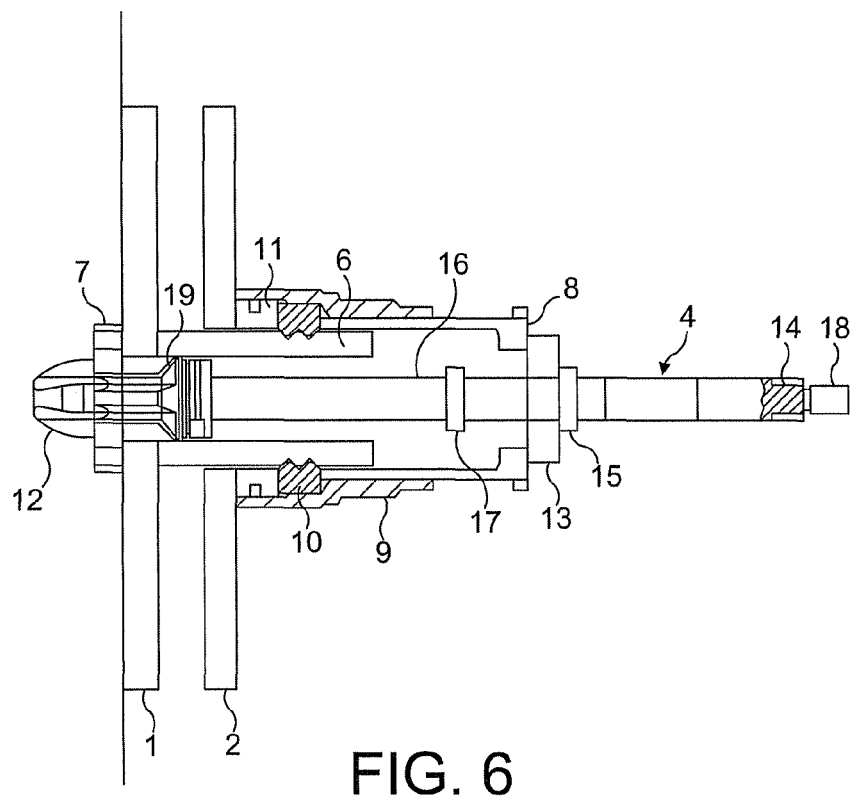
FIGS. 6-9 illustrate steps in unlocking, unmating and separating the stabplate connection.

FIG. 6 shows the first stage of unmating the stabplates (typically using an ROV), the retrievable tooling package 4 being inserted into the tube 6 and the square-ended shaft 18 rotated to lock the chamfered end 12 behind the orifice of the anchor block 7. The plates are clamped together by rotating threaded shaft 14 within tube 16 to draw the plates together and unload the locking dogs.

Figure 7:
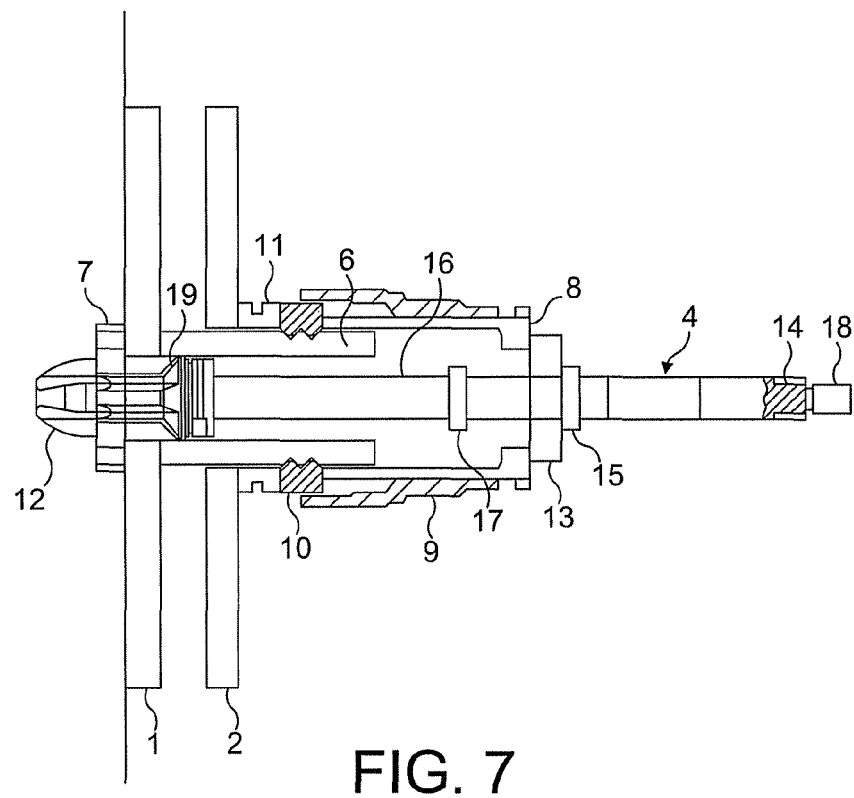

FIG. 7 shows the next stage, which is the rotation of the bayonet locking collar 9 to disengage it from the bayonet locking pin locator 11, allowing the collar 9 to be withdrawn to the right in the figure, which releases the locking dogs 10, thus unlocking the stabplates 1 and 2. At this point the stabplates, although unlocked by the rotation of the bayonet locking collar 9, are still held together by the retrievable tooling package 4, i.e. the stabplate connections are still connected and fully operational. This feature gives the capability to exercise the permanently deployed latching mechanism whilst the stabplate connection system is fully operational. This supports the fact that this system does not need a secondary release mechanism and is an important feature of the arrangement according to the invention.

Figure 8:
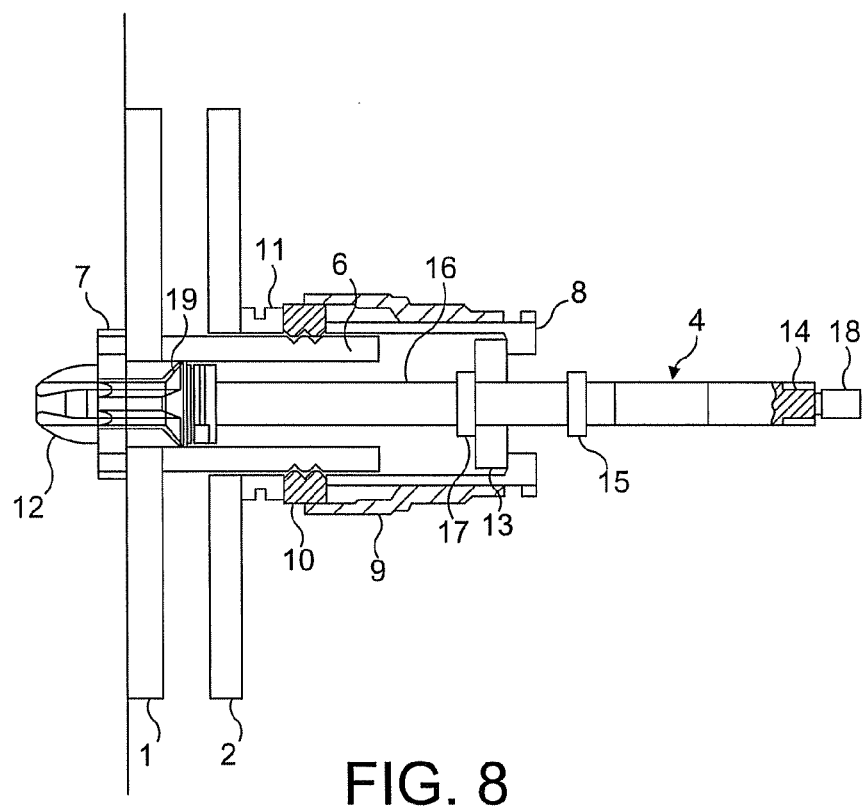

In order to separate the stabplates 1 and 2, considerable force is necessary to unmate the stabplates 1 and 2. As shown in FIG. 8, this is provided by moving the latching/de-latching plate 13 to the inside of the dog support cage 9. At this stage the pre-load applied by the shaft 14 and tube 16 will have been released and some partial separation of the plates will have taken place, allowing the next stage of plate separation to take place as described herein. The latching/de-latching plate 13 is splined on to the external surface of the tube 16 such that rotation of the collar 15, attached to the tube 16, rotates the plate 13 allowing it to slide to the left in the figures along the spline, with the plate 13 passing through the orifice of the dog support cage 8. The tube 16 is further rotated by about 45 degrees to prevent the latching/de-latching plate 13 passing back through the dog support cage 8, leaving the assembly in the position as shown in FIG. 8.

Figure 9:
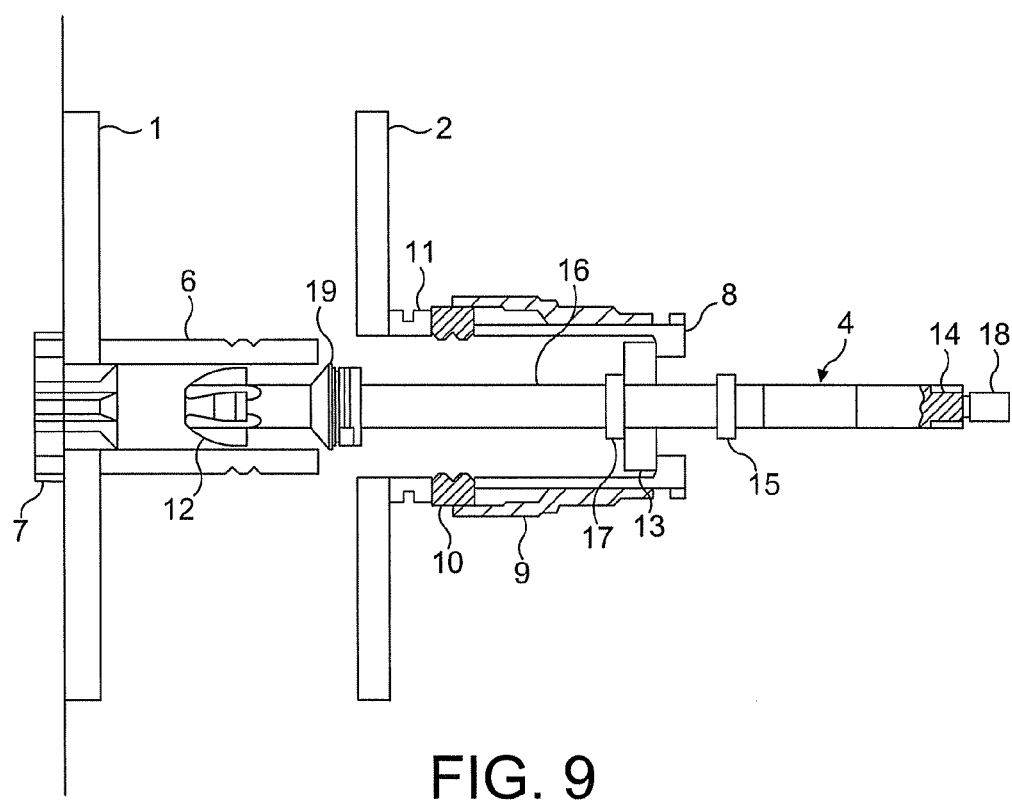

FIG. 9 shows the separation of the stabplates 1 and 2 completed by unscrewing the threaded shaft 14 from the tube 16, whereby the collar 17, attached to the tube 16, presses against the latching/de-latching plate 13, and thus the inside surface of the dog support cage 8, thus forcing the stabplates 1 and 2 apart. Removal of the stabplate 2, along with the retrievable tooling package 4 is finally achieved by the rotation of the square-ended shaft 18, to disengage the chamfered end 12 from the anchor block 7 and withdrawing the assembly to the right as shown in FIG. 9.

Figure 10:
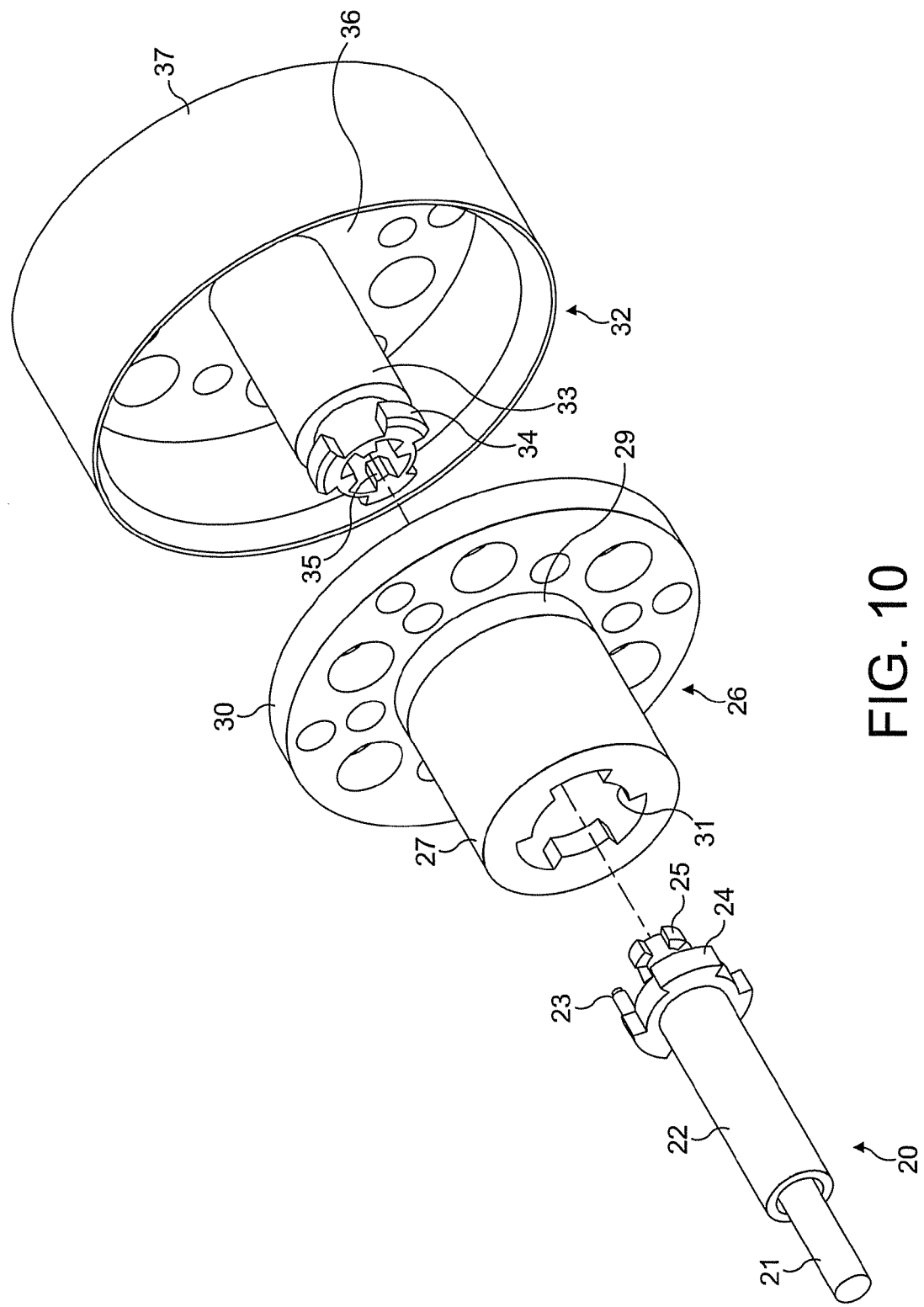
FIG. 10 is an exploded view of a second example of an arrangement according to the invention for providing a stabplate connection.
Figure 11:
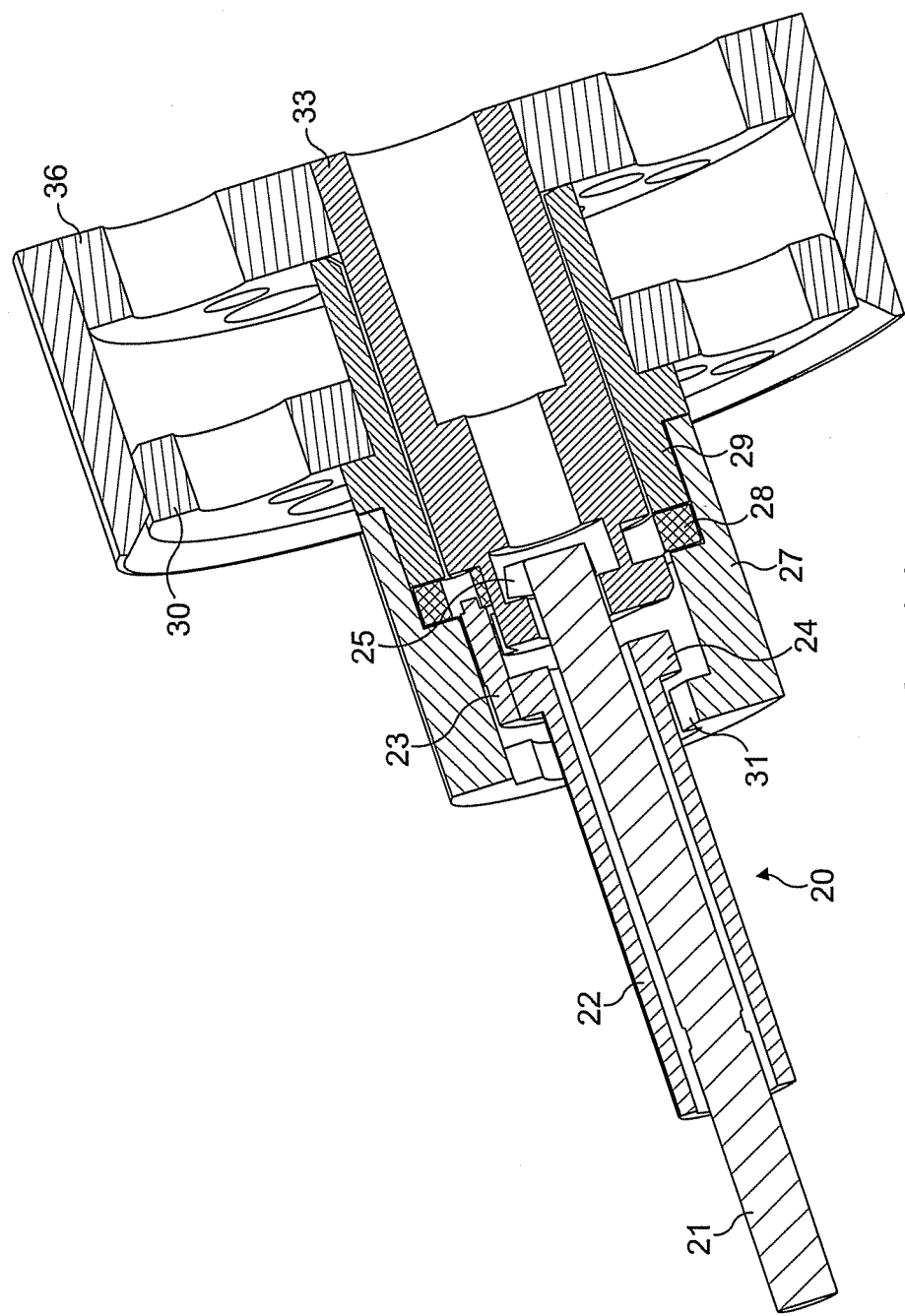
FIG. 11 is a cut-away view showing part of the FIG. 10 arrangement in use.

Referring now to FIGS. 10 and 11, reference numeral 20 designates tooling in the form of an ROV carried tooling package comprising an elongate ROV operated rotatable locking member 21 inside a generally cylindrical ROV operated rotatable clamp tool 22. Tool 22 carries a pin 23 and three tags 24 and locking member 21 carries tags 25. A removable part 26 for a stabplate connection comprises a housing 27 inside which there is a locking ring 28 (see FIG. 11), a locking ring housing 29 and a stabplate 30 (hereinafter called a "flying plate"). At the front opening of housing 27 there are three tags 31. A fixed part 32 for the stabplate connection is fixed to an underwater structure such as a well tree and comprises a fixed central housing 33 having at its opening three external tags 34 and four internal tags 35, a fixed stabplate 36 and a fixed surround 37 for the stabplate 36 and housing 33.

Operation of the arrangement of FIG. 10 is as follows.

Stabplate Installation Process
Stage 1—Tooling Package Picks Up Flying Plate

The tooling package 20 is inserted into part 26 with locking member 21 passing through the flying plate 30.

Pin 23 and tags 24 are inserted between the tags 31 on housing 27 so that pin 23 mates with a slot in ring 28 which is mounted and rotates between housing 27 and locking ring housing 29.

Clamp tool 22 is rotated by about 45 degrees anti-clockwise in FIG. 10 by a screw thread mechanism of an ROV carrying tool package 20 to engage the tooling package 20 in flying plate 30. Tags 24 are engaged behind tags 31 to lock the flying plate onto the tooling package, with the rotation of clamp tool 22 also rotating ring 28 into an "unlocked" position by pin 23 interfacing with the slot in ring 28.

The tooling package 20 now carries the flying stabplate assembly comprising part 26. The tooling package 20 is pushed against the front face of housing 27, in practice via an ROV bucket which has been omitted for clarity.

Stage 2—Flying Plate Installed on to Fixed Plate

The tooling package 20 moves the flying plate 30 on to the fixed plate 36, interfacing with housing 33. The locking member 21 passes inside housing 33 and the plates 30 and 36 are mated as follows. Locking member 21 is rotated by about 45 degrees clockwise in FIG. 10 to engage tags 25 with internal tags 35 of the housing 33.

Locking member 21 is then pulled by the screw thread mechanism to draw the part 26 on to the part 32 using the rear faces of tags 35 as one reaction point and the front face of housing 27 as a second reaction point, installation being completed when the rear face of locking ring housing 29 mates up to the front face of fixed plate 36 with the connectors of plates 30 and 36 being coupled with each other.

Stage 3—Latch Installation

With full pre-load applied (that is with locking ring housing 29 mated up against fixed plate 36), clamp tool 22 and pin 23 are rotated clockwise in FIG. 10 by about 45 degrees to engage locking ring 28 with the external tags 34 of housing 33. This locks the two plates 30 and 36 together and also aligns the tags 24 with the slots between tags 31 in the front of housing 27 for removal.

Stage 4—Tooling Package Removal

With the locking ring 28 engaged, the pre-load on locking member 21 is removed, allowing the plates 30 and 36 to settle into the latched (i.e. locked) position. Locking member 21 is then rotated anti-clockwise in FIG. 10 by about 45 degrees to disengage it from the tags 35 inside housing 33. The tooling package 20 may then now be withdrawn (for example being returned to the surface using the ROV), the stabplate connection now being complete with plates 30 and 36 installed and locked.

Stabplate Disconnection/Removal Operations
Stage 5—Tooling Package Insertion

Tooling package 20 is installed into the centre of the mated plates, pin 23 and tags 24 being aligned to pass between the tags 31 at the front of housing 27—in this position, pin 23 will fit into the slot on locking ring 28. Also, locking member 21 is aligned to pass between the tags 35 on the inside of housing 33.

Stage 6—De-Latching

Locking member 21 is rotated clockwise in FIG. 10 by about 45 degrees in FIG. 10 to engage tags 25 with tags 35 and a pre-load is applied to locking member 21, sufficient to unload locking ring 28. Clamp tool 22 and pin 23 are then rotated anti-clockwise in FIG. 10 by about 45 degrees to disengage the locking ring 28 and engage the tags 24 on clamp tool 22 with the insides of the tags 31 on the outside of housing 27.

Stage 7—Unmating Plates

A reverse loading is applied on locking member 21 by a screw thread mechanism of an ROV carrying tool package 20 to apply a separation force between the reaction to points (the inside of housing 33 behind tags 35 and the inside faces of the tags 31 at the front of housing 27). Loading is applied until all connectors on the plates 30 and 36 have separated fully. Locking member 21 is then rotated anti-clockwise in FIG. 10 by about 45 degrees to disengage it from the tags 35 and part 26 is then withdrawn, stabplate disconnection now being complete.

Stage 8—Removing Tooling Package from Flying Plate Part

With part 26 supported, clamp tool 22 and pin 33 are rotated clockwise in FIG. 10 by about 45 degrees to disengage the tags 24 on clamp tool 22 from the tags 31 on housing 27 and the tooling package 20 is withdrawn from part 26 by the ROV.

Figure 12:
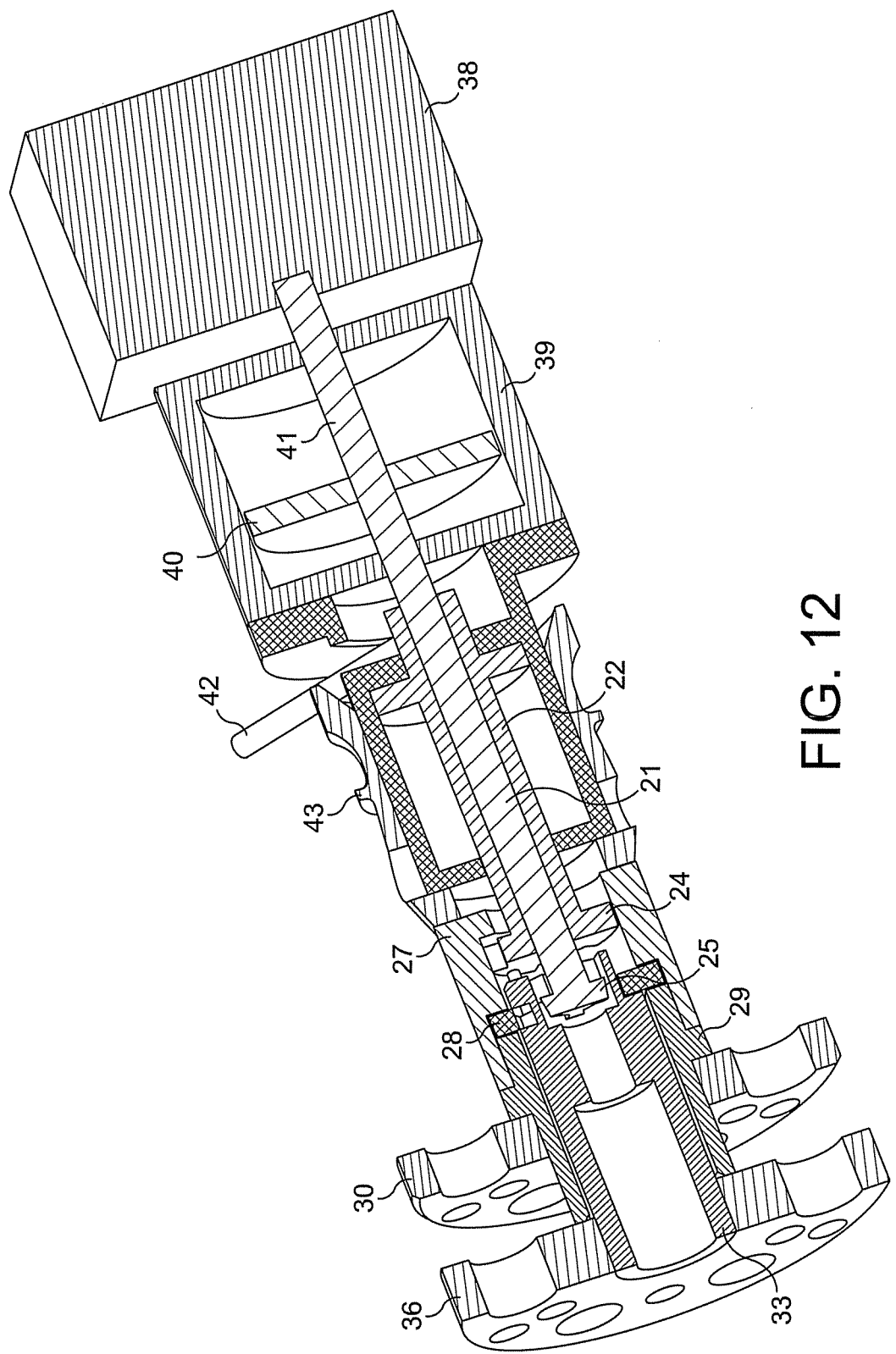
FIG. 12 is a cut-away view of a third example of an arrangement according to the invention.

Referring now to FIG. 12 (in which items which are the same as in FIG. 10 have the same reference numerals as in FIG. 10) there will now be described another example of an arrangement according to the invention in which a tooling package is operated hydraulically. In FIG. 12, reference numeral 38 designates a rotary actuator, reference numeral 39 designates a hydraulic actuator body, reference numeral 40 designates a hydraulic actuator piston on a hydraulic actuator shaft 41 (which is an extension of member 21), reference numeral 42 designates a latch operating lever and reference numeral 43 designates an ROV bucket.

The hydraulically actuated tooling package 20 operates the same stabplate connection arrangement as described above with reference to FIGS. 10 and 11. However, rather than using a screw thread mechanism to apply the pre-load required to draw the plates 30 and 36 together, linear hydraulic actuator arrangement 39, 40, 41 (with a short stroke of approximately 5") is used instead.

The linear hydraulic actuator arrangement is mounted on rotary hydraulic actuator 38 and this in turn is fixed to an ROV by suitable mountings. Hydraulic power is provided from the ROV to drive a) the linear hydraulic actuator arrangement and b) the rotary actuator.

The linear actuator shaft 41 is fixed at the rotary actuator 36 by a flange or similar device and this will cause the shaft to rotate by about 45 degrees in either direction as required to engage and disengage the locking member 25 from the tags 35 within housing 33.

Because the shaft 41 is fixed, movement of the piston 40 causes the tooling package to move laterally, thus applying preload for stabplate connection, or alternatively, providing separation forces acting on reaction faces as described above.

The rotating locking ring 28 is in the same position in the flying plate assembly and is operated by the pin 23 mounted on the clamp tool 22, which is operated by lever 42, although hydraulic actuation above may be used. The angle of rotation required is about 45 degrees as previously described.

The sequence of operations is as above, but actuation is by hydraulic power.

ADVANTAGES OF USING THE INVENTION

The invention enables a reduction in weight and complexity and thus the cost of stabplate systems by removing the majority of locking mechanisms to a recoverable tooling and leaving minimal equipment, such as the locking mechanism, subsea for long term installation. Also the invention enables removal of the necessity for complicated and costly secondary release systems, provided in the event of seizure, on stabplates, further reducing complexity and cost; and the capability of allowing exercising of the locking mechanism in situ without actually parting the stabplates.

The invention claimed is:

1. A method providing a stabplate connection, comprising the steps of:
    (a) providing a first part comprising a first stabplate and which is attached to an underwater structure;
    (b) providing a second part comprising a second stabplate carried by tooling;
    (c) engaging an end part of the tooling with said first part after passing the end part through said second part;
    (d) using the tooling to bring the first and second parts together so that said first and second stabplates mate with each other;
    (e) using the tooling to lock the first and second parts together by engaging a portion carried by the first part with a portion carried by the second part;
    (f) disengaging the end part of the tooling from the first part; and
    (g) removing tooling portions positioned within the second part from within said second part after disengaging the end part of the tooling, the first and the second parts remaining locked together.

2. A method according to claim 1,
    wherein said tooling includes an elongate locking member,
    wherein the end part is connected to the elongate locking member, and
    wherein the step of removing tooling portions positioned within the second part from within said second part includes retrieving both the end part and the elongate locking member after completing the stabplate connection.

3. A method according to claim 1, wherein said portion carried by the second part comprises a locking dog moved into a locking position using said tooling.

4. A method according to claim 3, wherein said tooling moves a collar carried by said second part to move said locking dog into a locking position, said collar comprising a bayonet fitting for locking and unlocking the mated first and second stab plates as a result of rotation of the collar.

5. A method according to claim 1, wherein said portions of the first and second parts comprise a rotatable latching member of one of the first and second parts which engages with a latching member of the other of said first and second parts.

6. A method according to claim 1, wherein steps (c) to (g) are carried out using an ROV carrying said tooling.

7. A stabplate connection provided by a method according to claim 1.

8. A method of disconnecting a stabplate connection provided by a method which comprises:
    (a) providing a first part comprising a first stabplate and which is attached to an underwater structure;
    (b) providing a second part comprising a second stabplate carried by tooling;
    (c) engaging a portion of the tooling with said first part after passing the portion of the tooling through said second part;
    (d) using the tooling to bring the first and second parts together so that said first and second stabplates mate with each other;
    (e) using the tooling to lock the first and second parts together by engaging a portion of or carried by the first part with a portion of or carried by the second part to form a stabplate connection;
    (f) disengaging the portion of the tooling from the first part after completing the stabplate connection; and
    (g) removing tooling parts positioned within the second part after disengaging the portion of the tooling from the first part;
    (h) reengaging the portion of the tooling with the first part;
    (i) using the tooling to unlock the first and second parts from each other by disengaging said portion of or carried by the first part from said portion of or carried by the second part;
    (j) using the tooling to unmate the first and the second stabplates from each other; and
    (k) using the tooling to retrieve the second part.

9. A method according to claim 8, wherein steps (h) to (k) are carried out using an ROV carrying said tooling.

10. An arrangement for providing a stabplate connection, comprising:
    a first part for being attached to an underwater structure and comprising a first stabplate;
    a second part comprising a second stabplate configured to be carried by tooling;
    means for bringing the first and second parts together so that the first and the second stabplates mate with each other, including portions of said tooling comprising an elongate locking member and an end part connected to the elongate locking member, and
    means for locking the first and second parts together, including means for engaging a portion carried by the second part with a portion carried by the first part; and
    the tooling configured to be disengaged from the first part and to be removed from within the first and the second parts after completing the stabplate connection, with the first and second parts remaining locked together after removal of the tooling therefrom.

11. An arrangement according to claim 10, wherein the end part is engageable with said first part after being passed through said second part.

12. An arrangement according to claim 10, wherein said portion carried by the second part comprises a locking dog movable using said tooling.

13. An arrangement according to claim 12, wherein said means for locking the first and second parts together includes a collar carried by said second part, said collar being movable by said tooling to move said locking dog, said collar comprising a bayonet fitting positioned to be locked to said second part as a result of rotation of the collar.

14. An arrangement according to claim 10, wherein one of said portions carried by one of the first and second parts comprises a rotatable latching member engageable with a latching member comprised by the other of said portions carried by the other one of the first and second parts.

15. A method according to claim 1, wherein said portion carried by the second part comprises a rotatable first latching member which engages with a second latching member comprised by said portion carried by first part.

16. A method according to claim 15, wherein said second latching member comprises a locking ring contained within a housing.

17. A method according to claim 1, further comprising wherein the tooling includes:
    an elongate locking member connected to the end part,
    a hydraulic rotary actuator configured to rotate the elongate locking member and end part to engage the first part, and
    a hydraulic linear actuator operably coupled to the elongate locking member and configured to linearly actuate the elongate locking member and end part when engaging the first part to draw the first and the second parts together; and wherein the step of using the tooling to bring the first and second parts together comprises:
rotating the elongate locking member and end part to engage the first part using the hydraulic rotary actuator, and
linearly actuating the elongate locking member and end part when engaging the first part using the hydraulic linear actuator to thereby bring the first and second parts together.

18. A method according to claim 9, further comprising the step of returning the tooling to a surface platform after performing step (g) and prior to performing step (h).

19. An arrangement according to claim 10, wherein said portion carried by the first part comprises a first latching member, and wherein said portion carried by the second part comprises a rotatable second latching member which engages with the first latching member.

20. An arrangement according to claim 19, wherein said rotatable second latching member comprises a locking ring contained within a housing.

21. An arrangement according to claim 10, further comprising:
means for retrieving the tooling from within the first and the second parts after completing the stabplate connection, with the stabplate connection remaining intact.

22. An arrangement according to claim 10,
wherein the portion carried by the first part includes a splined member;
wherein the portion carried by the second part includes a locking ring member configured to engage the splined member; and
wherein the means for locking the first and second parts together includes a clamping member circumscribing the elongate locking member and configured to rotate the splined member to engage the locking ring member.

23. An arrangement according to claim 10, wherein the means for bring the first and second parts together so that the first and the second stabplates mate with each other, comprises:
a hydraulic rotary actuator configured to rotate the elongate locking member and end part to engage the first part; and
a hydraulic linear actuator operably coupled to the elongate locking member and configured to linearly actuate the elongate locking member and end part when engaging the first part to draw the first and the second parts together.

24. A method providing a stabplate connection, comprising the steps of:
(a) providing a first part comprising a first stabplate and which is attached to an underwater structure;
(b) providing a second part comprising a second stabplate carried by tooling;
(c) engaging the tooling with said first part after passing portions of the tooling through said second part;
(d) using the tooling to bring the first and second parts together so that said first and second stabplates mate with each other;
(e) using the tooling to lock the first and second parts together by engaging a portion carried by the first part with a portion carried by the second part;
(f) disengaging the tooling from the first part; and
(g) removing tooling portions positioned within the second part from within said second part after disengaging the tooling, the first and the second parts remaining locked together,
wherein steps (c) to (g) are carried out using an ROV carrying said tooling.

25. An arrangement for providing a stabplate connection, comprising:
a first part for being attached to an underwater structure and comprising a first stabplate;
a second part comprising a second stabplate configured to be carried by tooling;
a first latching member carried by one of the first and the second parts;
a rotatable second latching member carried by the other of the first and second parts and engageable with the first latching member; and
said tooling comprising:
an elongate locking member,
an end part connected to the elongate locking member, the end part being engageable with said first part after being passed through said second part, and
a rotatable clamping member including a ring engagement member configured to be rotated to thereby cause the rotatable second latching member to engage with first latching member and to lock the first part and the second parts together;
a rotary actuator configured to rotate the elongate locking member and end part to engage the first part;
a linear actuator operably coupled to the elongate locking member and configured to linearly actuate the elongate locking member and end part when engaging the first part to draw the first and the second parts together,
the tooling configured to be disengaged from the first part and to be removed from within the first and the second parts after completing the stabplate connection, with the first and second parts remaining locked together after removal of the tooling therefrom.

26. An arrangement according to claim 25, wherein the first latching member is carried by the first part, and wherein the rotatable second latching member is carried by the second part.

27. An arrangement according to claim 26, wherein the tooling further comprises a lever connected to the clamping tool to provide for rotating the clamping tool.

28. An arrangement according to claim 26, wherein the rotatable second latching member comprises a locking ring contained within a housing.

29. An arrangement according to claim 25, wherein the first latching member is carried by the second part, and wherein the rotatable second latching member engages with the first latching member and is carried by the first part.

30. An arrangement according to claim 29, wherein the rotatable second latching member comprises a locking ring contained within a housing.

31. An arrangement according to claim 25, further comprising means for retrieving the tooling from within the first and the second parts after completing the stabplate connection, with the stabplate connection remaining intact.

32. An arrangement according to claim 25, wherein the rotary actuator is a hydraulic rotary actuator, and wherein the linear actuator is a hydraulic linear actuator.

* * * * *